US012494316B2

(12) United States Patent
Chiu et al.

(10) Patent No.: US 12,494,316 B2
(45) Date of Patent: Dec. 9, 2025

(54) INDUCTIVE DEVICE

(71) Applicant: CHILISIN ELECTRONICS CORP., Hsinchu County (TW)

(72) Inventors: Ming-Chieh Chiu, Taoyuan (TW); Shan-Cheng Wu, Taoyuan (TW)

(73) Assignee: CHILISIN ELECTRONICS CORP., Hsinchu County (TW)

( * ) Notice: Subject to any disclaimer, the term of this patent is extended or adjusted under 35 U.S.C. 154(b) by 901 days.

(21) Appl. No.: 17/707,915

(22) Filed: Mar. 29, 2022

(65) Prior Publication Data

US 2023/0103251 A1 Mar. 30, 2023

(30) Foreign Application Priority Data

Sep. 29, 2021 (TW) ................................ 110136141

(51) Int. Cl.
*H01F 5/00* (2006.01)
*H01F 27/28* (2006.01)
(Continued)

(52) U.S. Cl.
CPC ......... *H01F 27/2804* (2013.01); *H01F 27/29* (2013.01); *H01F 27/323* (2013.01); *H01F 2027/2809* (2013.01)

(58) Field of Classification Search
CPC .................................................. H01F 27/2804
(Continued)

(56) References Cited

U.S. PATENT DOCUMENTS 8,201,318 B2 6/2012 Yamano
10,943,727 B2 3/2021 Shimoda et al.
(Continued)

FOREIGN PATENT DOCUMENTS

CN 1268757 A 10/2000
CN 107808734 A 3/2018
(Continued)

OTHER PUBLICATIONS

English translation of KR20190044262 (Year: 2019).*
Notice of Allowance issued on Feb. 25, 2022 for TW application No. 110136141.

*Primary Examiner* — Ronald Hinson
(74) *Attorney, Agent, or Firm* — Li & Cai Intellectual Property Office

(57) ABSTRACT

An inductive device is provided. The inductive device includes a laminated body and two external electrodes. The laminated body includes an insulator and a plurality of conductive wiring layers stacked in a first direction. The conductive wiring layers are embedded within the insulator, and any two adjacent ones of the conductive wiring layers are electrically connected to each other to form a coiled conductor extending spirally. The external electrodes are disposed on the laminated body and electrically connected to the coiled conductor, and the external electrodes are spaced apart from each other. Each of the external electrodes includes a base plate, a lateral wall, and a plurality of stress dispersing structures extending toward the coiled conductor and protruding from at least one of the base plate and the lateral wall, and the stress dispersing structures are spaced apart from each other and engaged with the laminated body.

15 Claims, 10 Drawing Sheets

(51) Int. Cl.
*H01F 27/29* (2006.01)
*H01F 27/32* (2006.01)

(58) Field of Classification Search
USPC .................................................. 336/192, 200
See application file for complete search history.

(56) References Cited

U.S. PATENT DOCUMENTS

| | | | | |
|---|---|---|---|---|
| 2018/0090266 | A1* | 3/2018 | Sano | H01F 27/292 |
| 2019/0051450 | A1* | 2/2019 | Shimoda | H01F 27/292 |
| 2019/0066912 | A1* | 2/2019 | Takeda | H01F 27/323 |
| 2020/0373065 | A1 | 11/2020 | Hirukawa | |
| 2021/0027934 | A1* | 1/2021 | Mizukami | H01F 27/2804 |

FOREIGN PATENT DOCUMENTS

| | | | |
|---|---|---|---|
| CN | 112071554 | A | 12/2020 |
| TW | I724965 | B | 4/2021 |

* cited by examiner

INDUCTIVE DEVICE

CROSS-REFERENCE TO RELATED PATENT APPLICATION

This application claims the benefit of priority to Taiwan Patent Application No. 110136141, filed on Sep. 29, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a passive device, and more particularly to an inductive device.

BACKGROUND OF THE DISCLOSURE

A conventional laminated inductive device usually includes an insulator, an internal conductor, and two external electrodes. Each of the external electrodes has a portion exposed outside of the insulator so as to serve as a connecting terminal of the internal conductor for being connected to another electric circuit. Specifically, the two external electrodes can be mounted on the solder pads on a circuit board, respectively, so that the laminated inductive device is mounted on and electrically connected to the circuit board.

However, when a push test is performed on the laminated inductive device mounted on the circuit board to assess the reliability thereof, stress is easily accumulated on the external electrodes of the laminated inductive device, which can cause the laminated inductive device to break. The laminated inductive device is usually broken at the external electrodes or at a joint between either one of the external electrodes and the insulator. Accordingly, how the structural design of the laminated inductive device can be modified to address the abovementioned inadequacies has become one of the important issues to be addressed in this industry.

SUMMARY OF THE DISCLOSURE

In response to the above-referenced technical inadequacies, the present disclosure provides an inductive device. After the inductive device is mounted on a circuit board, the inductive device is not easily broken due to a lateral force and has higher reliability.

In one aspect, the present disclosure provides an inductive device. The inductive device includes a laminated body and two external electrodes. The laminated body includes an insulator and a plurality of conductive wiring layers stacked in a first direction. The conductive wiring layers are embedded within the insulator, and any two adjacent ones of the conductive wiring layers are electrically connected to each other to form a coiled conductor that extends spirally. The external electrodes are disposed on the laminated body and electrically connected to the coiled conductor, and the external electrodes are spaced apart from each other. Each of the external electrodes includes a base plate, a lateral wall, and a plurality of stress dispersing structures extending toward the coiled conductor and protruding from at least one of the base plate and the lateral wall, and the stress dispersing structures are spaced apart from each other and engaged with the laminated body.

In another aspect, the present disclosure provides an inductive device. The inductive device includes a laminated body and two external electrodes. The laminated body includes an insulator and a plurality of conductive wiring layers stacked in a first direction. The conductive wiring layers are embedded within the insulator, and any two adjacent ones of the conductive wiring layers are electrically connected to each other to form a coiled conductor that extends spirally. The external electrodes are disposed on the laminated body and electrically connected to the coiled conductor, and the external electrodes are spaced apart from each other. Each of the external electrodes includes one or more first stack layers and one or more second stack layers that are stacked in the first direction. Each of the first stack layers includes one or more first patterned layers, and each of the second stack layers has a curved inner surface and includes one or more second patterned layers. An area of each of the first patterned layers is less than that of each of the second patterned layers.

Therefore, in the inductive device provided by the present disclosure, by virtue of each of the external electrodes including a base plate, a lateral wall, and a plurality of stress dispersing structures extending toward the coiled conductor and protruding from at least one of the base plate and the lateral wall, and the stress dispersing structures being spaced apart from each other and being engaged with the laminated body or each of the external electrodes including one or more first stack layers and one or more second stack layers that are stacked in the first direction, each of the first stack layers including one or more first patterned layers, each of the second stack layers having a curved inner surface and including one or more second patterned layers, and an area of each of the first patterned layers being less than that of each of the second patterned layers, a reliability of the inductive device can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
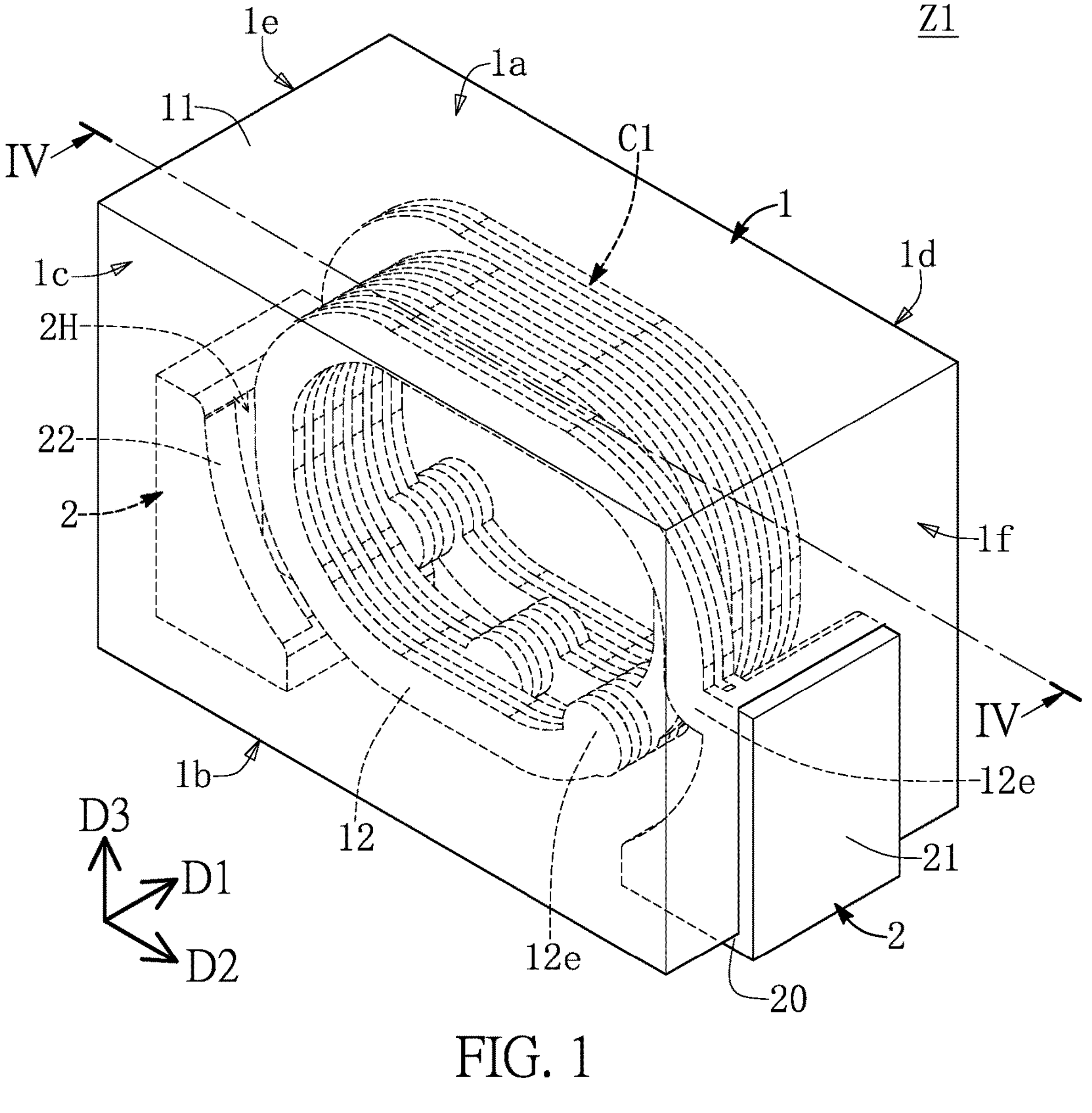
FIG. 1 is a schematic perspective view of an inductive device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
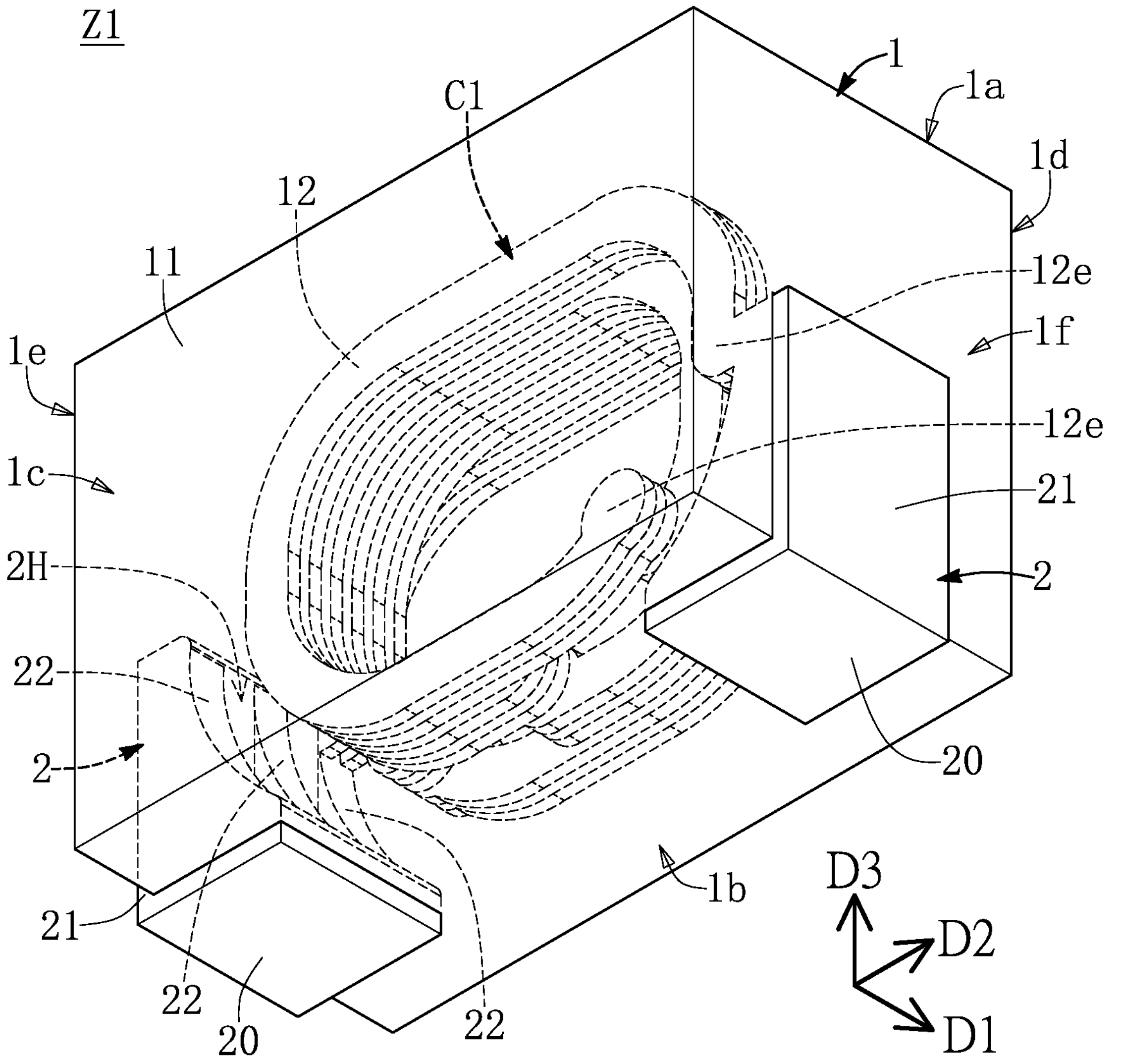
FIG. 2 is another schematic perspective view of the inductive device according to the first embodiment of the present disclosure.
Figure 3:
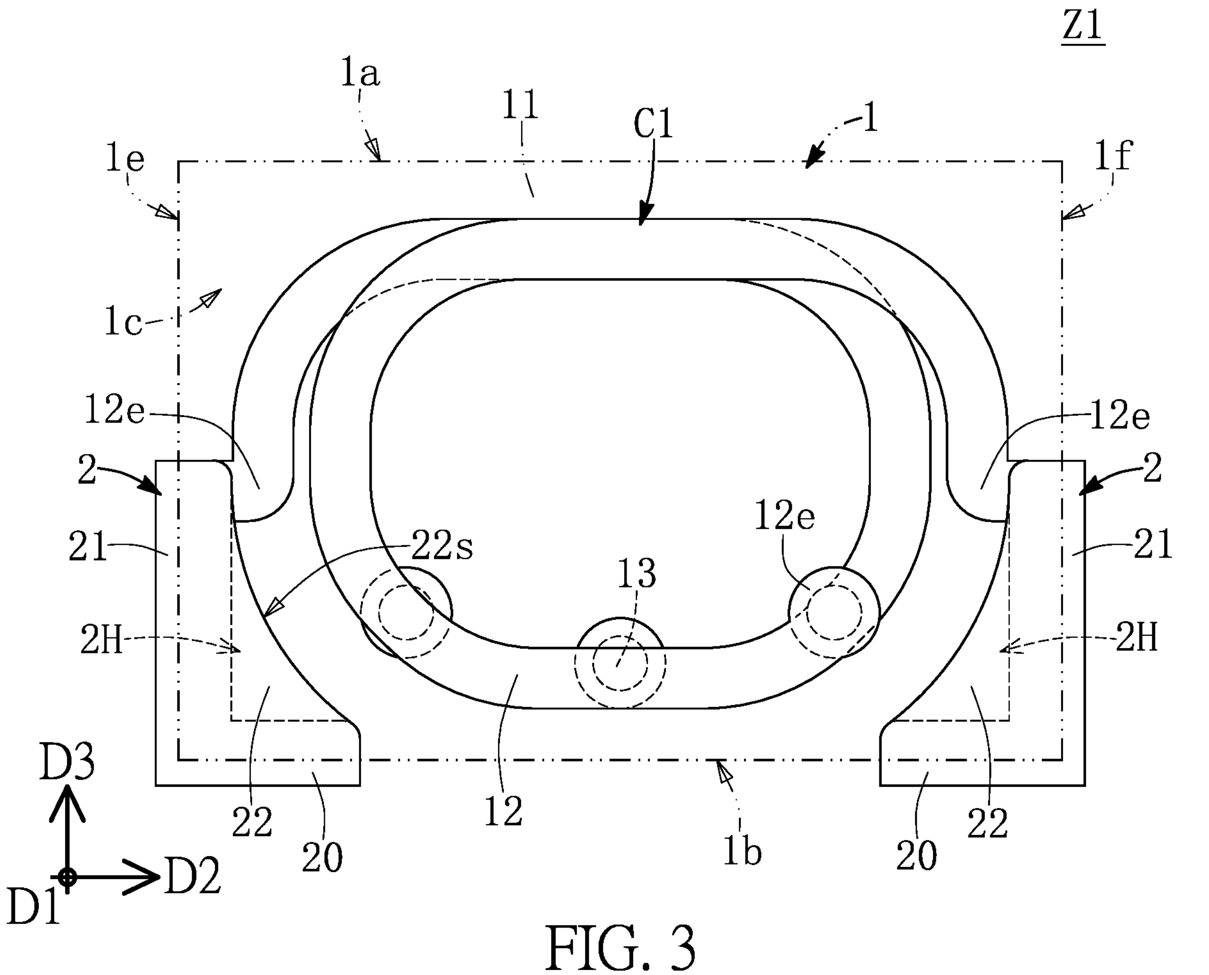
FIG. 3 is a schematic side view of the inductive device according to the first embodiment of the present disclosure.

Referring to FIG. 1 to FIG. 3, FIG. 1 is a schematic perspective view of an inductive device according to a first embodiment of the present disclosure, FIG. 2 is another schematic perspective view of the inductive device according to the first embodiment of the present disclosure, and FIG. 3 is a schematic side view of the inductive device according to the first embodiment of the present disclosure.

A first embodiment of the present disclosure provides an inductive device Z1. The inductive device Z1 includes a laminated body 1 and two external electrodes 2. The laminated body 1 includes an insulator 11 and a plurality of conductive wiring layers 12 that are stacked in a first direction D1. As shown in FIG. 1, in the instant embodiment, the laminated body 1 can have a top surface 1*a* and a bottom surface 1*b* opposite to each other, a first side surface 1*c* and a second side surface 1*d* opposite to each other, and a third side surface 1*e* and a fourth side surface 1*f* opposite to each other. Each of the first to fourth side surfaces 1*c* to 1*f* is connected between the top surface 1*a* and the bottom surface 1*b*.

The laminated body 1 includes the insulator 11 and the conductive wiring layers 12 stacked in the first direction D1. Specifically, the insulator 11 can be formed by laminating a plurality of insulating layers (that are not indicated by any reference numerals). A material of each insulating layer can be, for example, a ceramic material. Furthermore, any two adjacent ones of the conductive wiring layers 12 are spaced apart from each other by at least one of the insulating layers. That is to say, the laminated body 1 is formed by alternately stacking the insulating layers and the conductive wiring layers 12 in the first direction D1. As shown in FIG. 1, the conductive wiring layers 12 are embedded within the insulator 11, and any two adjacent ones of the conductive wiring layers 12 are serially connected to each other to establish an electrical connection therebetween, such as to form a coiled conductor C1 that extends spirally.

As shown in FIG. 1 and FIG. 2, each of the conductive wiring layers 12 is shaped as an opened loop and has two ending portions 2*e*. For two adjacent ones of the conductive wiring layers 12, one of the ending portions 2*e* of one of the conductive wiring layers 12 is aligned with one of the ending portions 2*e* of the other one of the conductive wiring layers 12 in the first direction D1.

Furthermore, as shown in FIG. 3, the laminated body 1 further includes a plurality of conductive posts 13, and each of the conductive posts 13 is connected between two adjacent ones of the conductive wiring layers 12. Specifically, each of the conductive posts 13 is formed in the insulator 11 and arranged at a position corresponding to one of the ending portions 2*e* of each of the conductive wiring layers 12. That is to say, each of the conductive posts 13 penetrates a corresponding one of the insulating layers that is interposed between two adjacent ones of the conductive wiring layers 12, so that the two adjacent ones of the conductive wiring layers 12 are electrically connected to each other through a corresponding one of the conductive posts 13. In the instant embodiment, each of the conductive posts 13 substantially extends in the first direction D1 and is connected between two ending portions 2*e*, which are in alignment with each other, of the two adjacent ones of the conductive wiring layers 12. As such, the conductive wiring layers 12 serially connected to one another through the conductive posts 13 can jointly form the coiled conductor C1 that extends spirally.

Referring to FIG. 1 and FIG. 2, the external electrodes 2 are disposed on the laminated body 1 and spaced apart from each other. The inductive device Z1 can be mounted on another circuit board through the external electrodes 2. As shown in FIG. 2, the external electrodes 2 are connected to the coiled conductor C1 that extends spirally. Specifically, two of the conductive wiring layers 12 that are respectively closest to the first side surface 1*c* and the second side surface 1*d* of the laminated body 1 are connected to the external electrodes 2, respectively.

As shown in FIG. 1 to FIG. 3, in the instant embodiment, each of the external electrodes 2 includes a base plate 20, a lateral wall 21, and a plurality of stress dispersing structures 22. As shown in FIG. 1, in the instant embodiment, the base plate 20 of each of the external electrodes 2 extends in a second direction D2. The lateral wall 21 of each of the external electrodes 2 protrudes from the base plate 20 and extends in a third direction D3. The second direction D2 and the third direction D3 are not parallel to the first direction D1. Accordingly, the base plate 20 and the lateral wall 21 jointly form an L-shaped structure.

Furthermore, the base plate 20 and the lateral wall 21 of each of the external electrodes 2 are each partially exposed outside of the laminated body 1. Specifically, two lateral walls 21 of the external electrodes 2 are partially exposed at two opposite side surfaces, for example, the third side surface 1*e* and the fourth side surface 1*f*, of the laminated body 1, respectively, but the present disclosure is not limited thereto.

Furthermore, as shown in FIG. 2, two base plates 20 of the external electrodes 2 are partially exposed at a same side of the laminated body 1. In the instant embodiment, the base plates 20 of the external electrodes 2 are both partially exposed at the bottom surface 1*b* of the laminated body 1, but the present disclosure is not limited thereto. As long as the external electrodes 2 are arranged to be spaced apart from each other, the position and the area where each of the external electrodes 2 is exposed at the laminated body 1 are not limited in the present disclosure.

As mentioned above, the stress dispersing structures 22 are spaced apart from each other and engaged with the laminated body 1. Since each of the external electrodes 2 includes at least one stress dispersing structure 22 engaged with the laminated body 1, when the inductive device Z1 receives an external force applied to the first side surface 1*c* or the second side surface 1*d*, the at least one stress dispersing structure 22 can disperse stress accumulated on the external electrodes 2 or a joint position between the insulator 11 and each of the external electrodes 2. As such, when an external force is applied to the inductive device Z1, a possibility of the external electrodes being broken can be reduced, thereby improving a reliability of the inductive device Z1. After the inductive device Z1 is mounted on another circuit board, the inductive device Z1 is less likely to be damaged when an external force is applied to the inductive device Z1.

Figure 4:
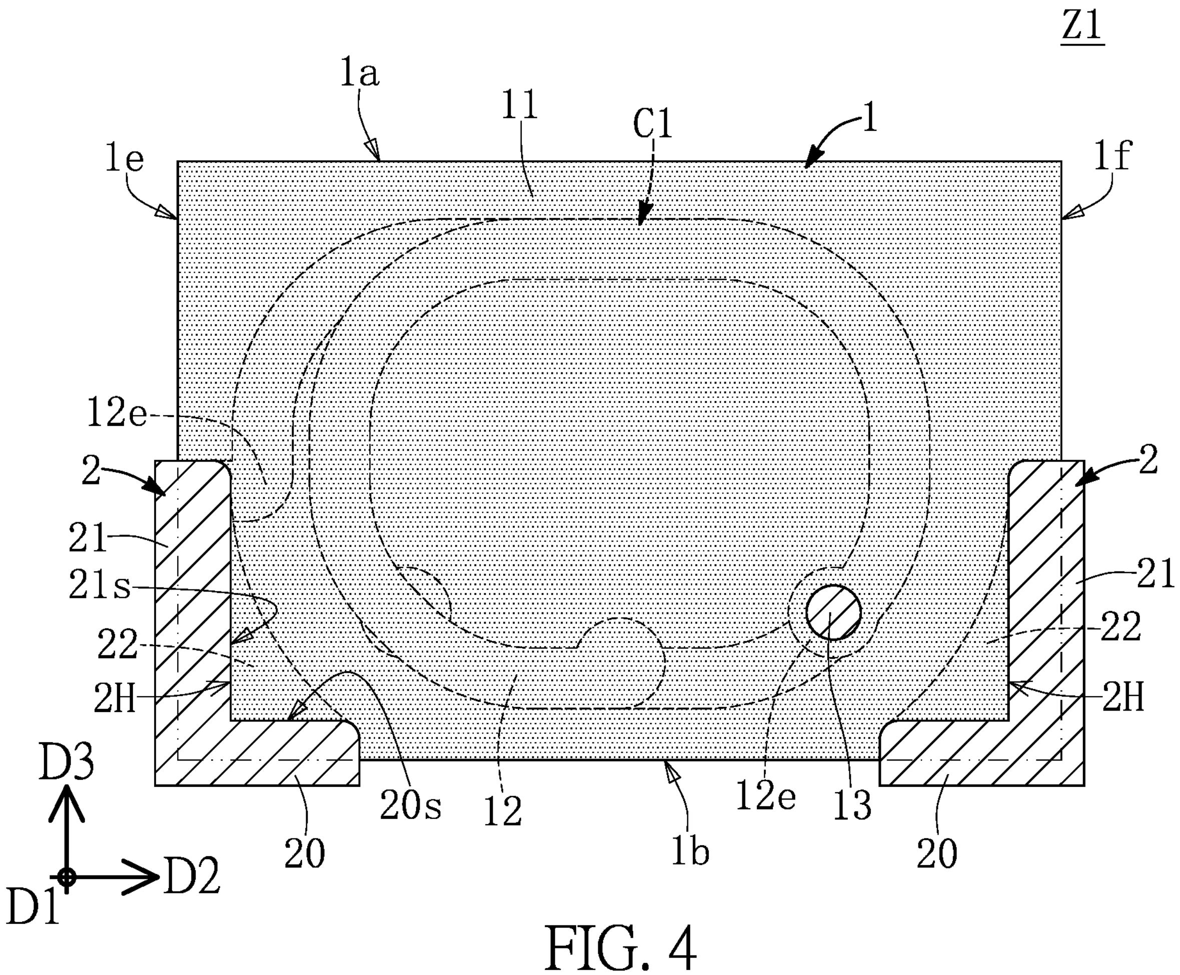
FIG. 4 is a cross-sectional view taken along line IV-IV of FIG. 1.
Figure 5:
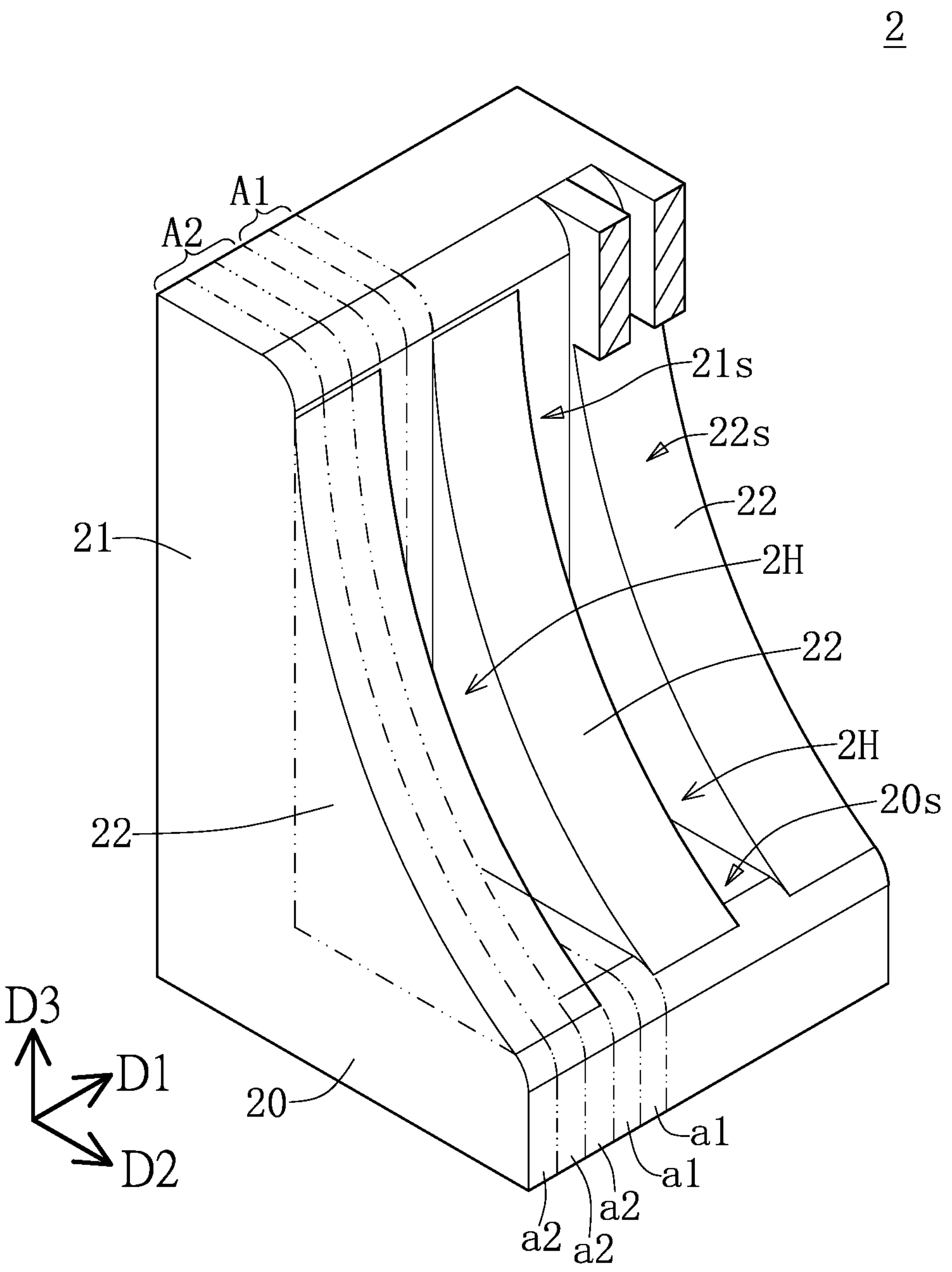
FIG. 5 is a schematic perspective view of an external electrode according to the first embodiment of the present disclosure.

Reference is made to FIG. 3 to FIG. 5, in which FIG. 4 is a cross-sectional view taken along line IV-IV of FIG. 1, and FIG. 5 is a schematic perspective view of an external electrode according to the first embodiment of the present disclosure. In each of the external electrodes 2, the stress dispersing structures 22 extend toward the coiled conductor C1 and protrude from at least one of the base plate 20 and the lateral wall 21. As shown in FIG. 5, each of the stress dispersing structures 22*h* as an inner surface 22*s* facing toward the coiled conductor C1, and the inner surface 22*s* protrudes from an inner side surface 21*s* of the lateral wall 21 to form a step difference. In the instant embodiment, since each of the stress dispersing structures 22 is connected to both the lateral wall 21 and the base plate 20, the inner surface 22*s* of each of the stress dispersing structures 22 also protrudes from an inner side surface 20*s* of the base plate 20 so as to form another step difference, but the present disclosure is not limited thereto. That is to say, each of the stress dispersing structures 22 can protrude from only one of the inner side surfaces 20*s*, 21*s* of the base plate 20 and the lateral wall 21.

As shown in FIG. 4 and FIG. 5, for each of the external electrodes 2, the stress dispersing structures 22, the lateral wall 21 and the base plate 20 can jointly define at least one recessed space 2H (more than one recessed spaces are exemplarily illustrated in FIG. 5). Accordingly, as shown in FIG. 4, a portion of the laminated body 1 (or the insulator 11) fills into the recessed space 2H, thereby increasing a bonding strength between the laminated body 1 and each of the external electrodes 2.

Reference is made to FIG. 5. In the instant embodiment, each of the external electrodes 2 includes one or more first stack layers A1 and one or more second stack layers A2 that are stacked on each other in the first direction D1. A quantity of the first stack layers is M, and a quantity of the second stack layers is N, in which M, N are each a positive integer equal to or greater than 1. In a preferred embodiment, the quantity (N) of the second stack layers A2 is greater than the quantity (M) of the first stack layers A1 (i.e., N≥M), which causes a lateral force applied to the inductive device Z1 to be more effectively dispersed. When the inductive device Z1 is mounted on a circuit board, the inductive device Z1 is capable of withstanding a greater lateral force.

That is to say, M of the first stack layers A1 and N of the second stack layers A2 are alternately arranged in the first direction D1 to form the external electrode 2. In the instant embodiment, two of the second stack layers A2 are located at the two outermost sides of the external electrode 2, but the present disclosure is not limited thereto. In another embodiment, one of the first stack layers A1 can be located at the outermost side of the external electrode 2. Accordingly, a stacking sequence of the first and second stack layers A1, A2 is not limited in the present disclosure.

As shown in FIG. 5, each of the first stack layers A1 can include one or more first patterned layers a1, and each of the second stack layers A2 can include one or more second patterned layers a2. In the embodiment of the present disclosure, an area of each of the first patterned layers a1 is less than that of each of the second patterned layers a2. In one embodiment, the area of each of the second patterned layers a2 is 1.01 to 1.5 times the area of each of the first patterned layers a1. To be more specific, the area of each of the second patterned layers a2 and the area of each of the first patterned layers a1 have a difference therebetween, and a ratio of the difference to the area of each of the first patterned layers a1 ranges from 1.02 to 2.15.

It should be noted that when the first stack layers A1 and the second stack layers A2 are stacked in the first direction D1, each of the first patterned layers a1 and each of the second patterned layers a2 partially overlap with each other. A portion of each of the second patterned layers a2 that does not overlap with any one of the first patterned layers a1 forms one of the abovementioned stress dispersing structures 22. Furthermore, each of the first patterned layers a1 completely overlaps with the second patterned layers a2 in the first direction D1. For example, each of the first patterned layers a1 is L-shaped, and each of the second patterned layers a2 is substantially in a wedge shape. However, as long as the area of the first patterned layer a1 is less than the area of the second patterned layer a2, the shapes of the first and second patterned layers a1, a2 are not limited to the examples provided in the present disclosure.

Furthermore, in the instant embodiment, each of the second stack layers A2 has a curved inner surface (which is the inner surface 22*s* of the stress dispersing structure 22). For example, the curved inner surface of each of the second stack layers A2 can be a concave surface, a convex surface, a stepped surface, or an inclined surface, but the present disclosure is not limited thereto.

Reference is made to FIG. 5. The quantity of the second patterned layers a2 in one of the second stack layers A2 needs not be the same as the quantity of the first patterned layers a1 in one of the first stack layers A1. Furthermore, two of the first stack layers A1 can include different quantities of the first patterned layers a1. Similarly, two of the second stack layers A2 can include different quantities of the second patterned layers a2. Accordingly, by optimizing the quantities of the first stack layers A1, the second stack layers A2, the first patterned layers a1, and the second patterned layers a2, the inductive device Z1 can withstand a larger lateral force, thereby improving the reliability of the inductive device Z1.

In the instant embodiment, the quantity of the second patterned layers a2 in one of the second stack layers A2 is greater than the quantity of the first patterned layers a1 in one of the first stack layers A1. For example, the second stack layer A2 can include three second patterned layers a2, and the first stack layer A1 can include two first patterned layers a1. However, the aforementioned details are disclosed for exemplary purposes only, and are not meant to limit the scope of the present disclosure.

Second Embodiment

Figure 6:
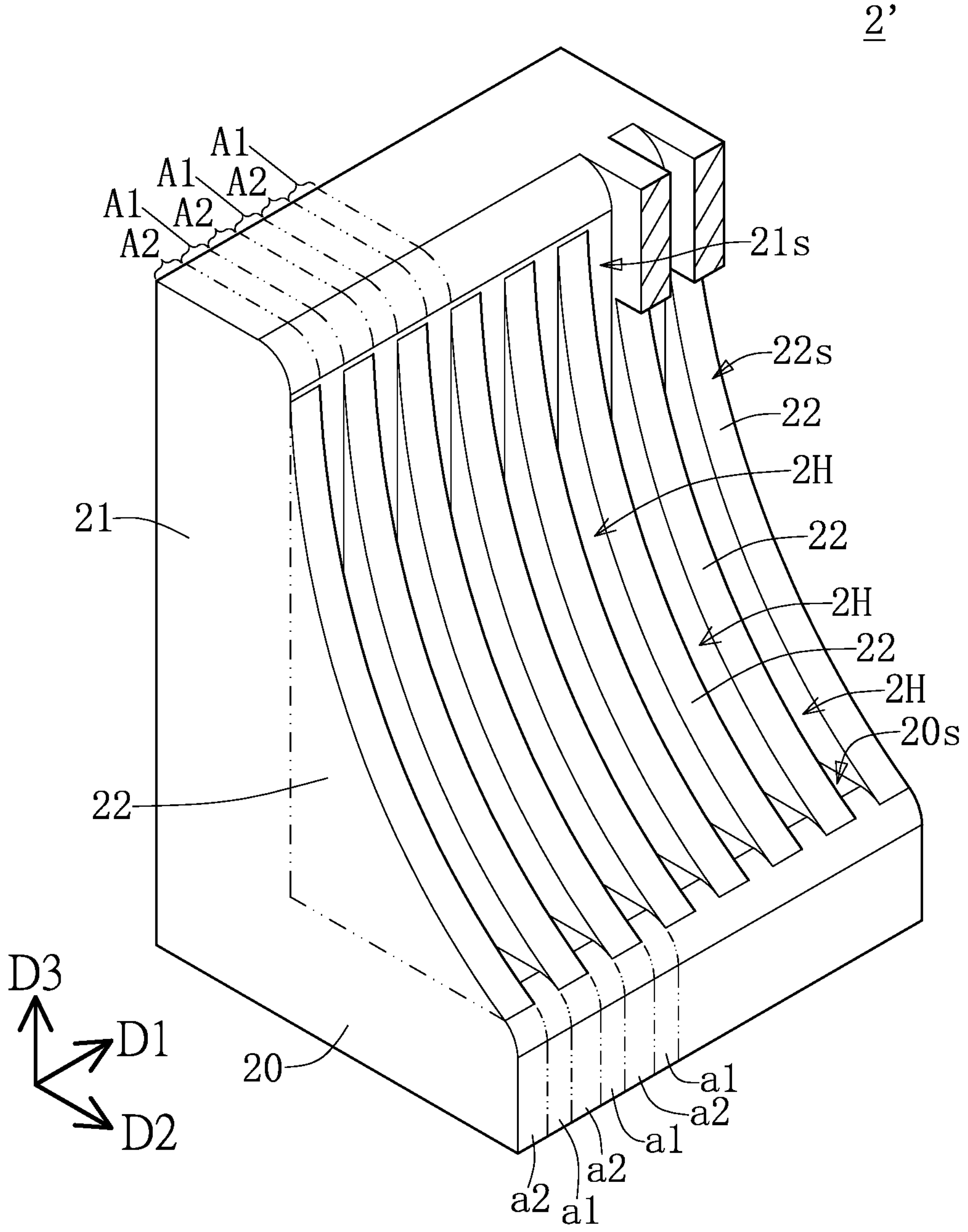
FIG. 6 is a schematic perspective view of an external electrode according to a second embodiment of the present disclosure.

Reference is made to FIG. 6, which is a schematic perspective view of an external electrode according to a second embodiment of the present disclosure. Elements of an external electrode 2' in the instant embodiment that are the same as or similar to those of the external electrode 2 in the first embodiment are denoted by the same or similar reference numerals, and will not be reiterated herein. In the instant embodiment, even though the first stack layers A1 each include only one first patterned layer a1, and the second stack layers A2 each include only one second patterned layer a2, the reliability of the inductive device Z1 still can be improved.

Accordingly, as long as the external electrode 2 (2') formed by laminating the first stack layer(s) A1 and the second stack layer(s) A2 includes the stress dispersing structure(s) 22 protruding from at least one of the base plate 20 and the lateral wall 21, the quantities of the first and second patterned layers a1, a2 are not limited in the present disclosure. In one embodiment, a ratio of the quantity of the second patterned layers a2 to the quantity of the first patterned layers a1 ranges from 0.1 to 10, preferably from 0.5 to 2.5, which results in higher reliability of the inductive device Z1. Furthermore, in a test result, compared to the embodiment in which the quantity of the second patterned layers a2 is less than or equal to the quantity of the first patterned layers a1, the inductive device Z1 of the embodiment in which the quantity of the second patterned layers a2 is greater than the quantity of the first patterned layers a1 can withstand a larger lateral force. That is to say, the ratio of the quantity of the second patterned layers a2 to the quantity of the first patterned layers a1 is preferably greater than 1.

Figure 7:
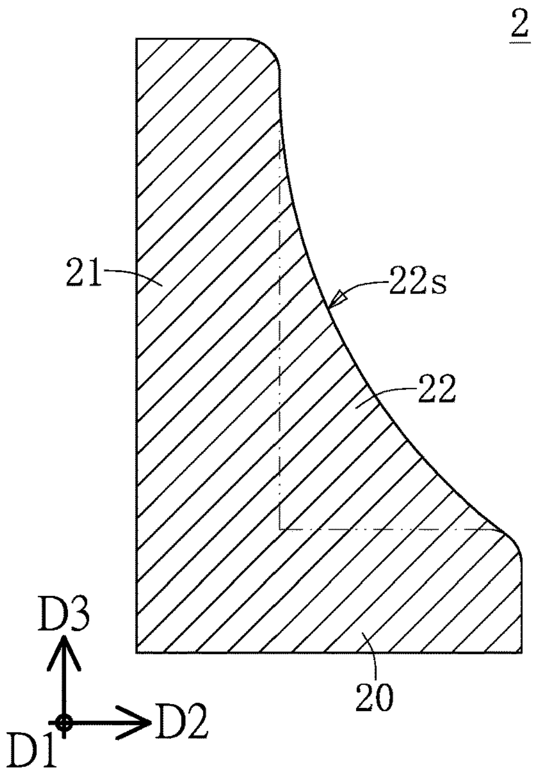
FIG. 7 is a schematic cross-sectional view of the external electrode according to the first embodiment of the present disclosure.

Reference is made to FIG. 7, which is a schematic cross-sectional view of the external electrode according to the first embodiment of the present disclosure. In the instant embodiment, each of the stress dispersing structures 22 is a protruding rib, and a width thereof gradually decreases from bottom to top (in the third direction D3). Moreover, in the instant embodiment, the inner surface 22*s* of the stress dispersing structures 22 is a concave surface, but the present disclosure is not limited to the example provided herein. In another embodiment, the stress dispersing structure 22 can be in another shape.

Figure 8A:
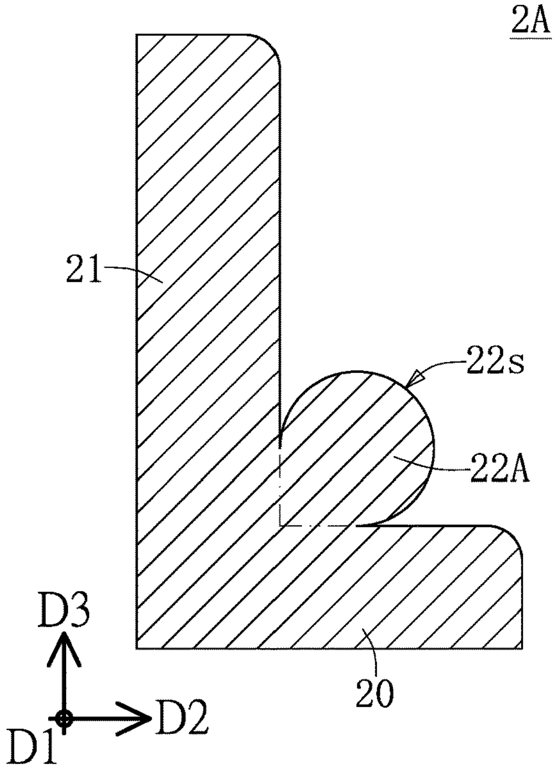
FIGS. 8A to 8F respectively show schematic cross-sectional views of different external electrodes in different embodiments of the present disclosure.

Reference is made to FIGS. 8A to 8F respectively showing schematic cross-sectional views of different external electrodes in different embodiments of the present disclosure. As shown in FIG. 8A, in the external electrode 2A of the instant embodiment, the stress dispersing structure 22A is a protruding column, and a cross-sectional shape of the stress dispersing structure 22A approximates to a circular shape. Accordingly, in the instant embodiment, the inner surface 22*s* of the stress dispersing structure 22A is a convex surface.

Figure 8B:
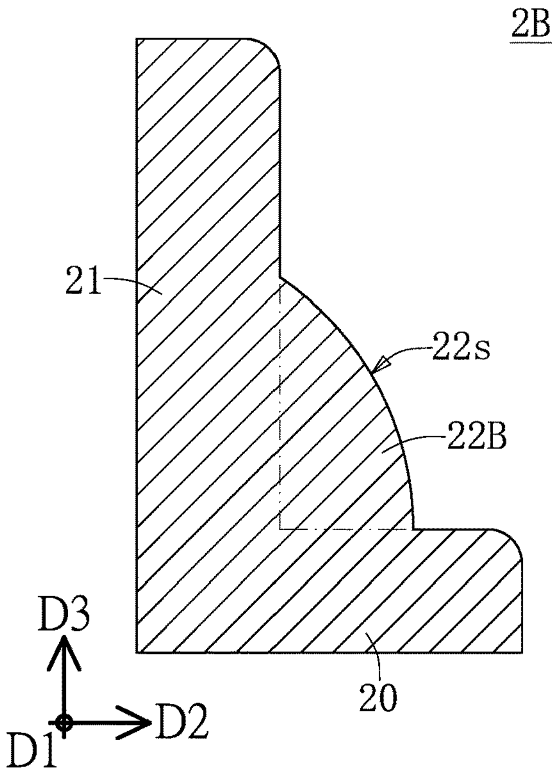

As shown in FIG. 8B, in the external electrode 2B of the instant embodiment, the stress dispersing structure 22B is a protruding rib, and a cross-sectional shape of the stress dispersing structure 22B approximates to a fan shape. Accordingly, in the instant embodiment, the inner surface 22*s* of the stress dispersing structure 22B is a convex surface. Furthermore, the stress dispersing structure 22B of the instant embodiment is connected between a middle portion of the lateral wall 21 and a middle portion of the base plate 20.

Figure 8C:
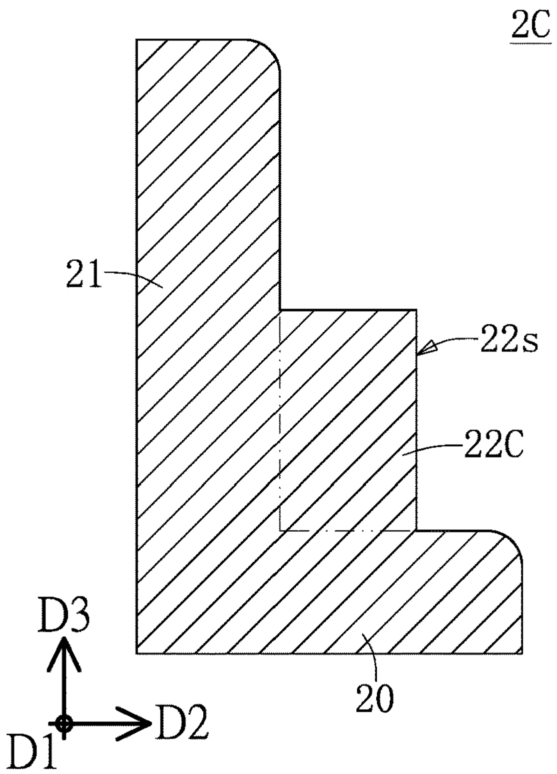

As shown in FIG. 8C, in the external electrode 2C of the instant embodiment, the stress dispersing structure 22C is a protruding bump, and a cross-sectional shape of the stress dispersing structure 22C approximates to a quadrilateral shape. Accordingly, in the instant embodiment, the inner surface 22*s* of the stress dispersing structure 22C has a stepped surface.

Figure 8D:
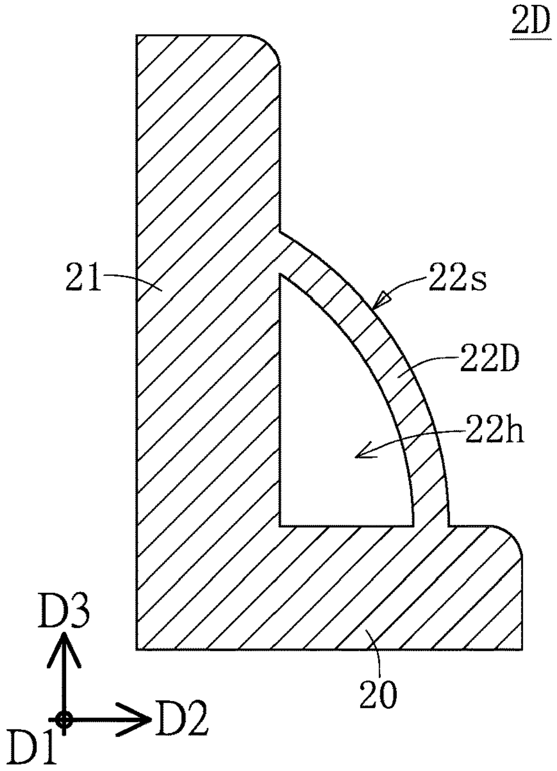
Figure 8E:
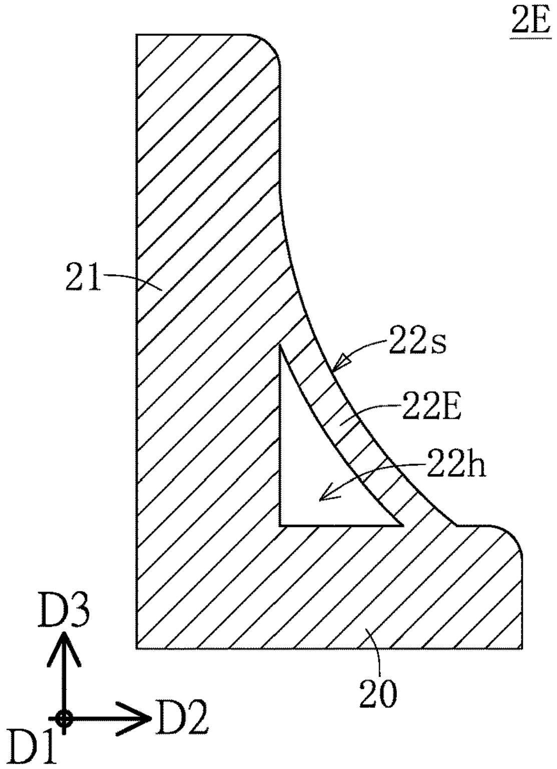

As shown in FIG. 8D and FIG. 8E, in each of the external electrodes 2D, 2E of the instant embodiment, each of the stress dispersing structures 22D, 22E is an arc-shaped connecting strip, and two ends of the arc-shaped connecting strip are respectively connected to the base plate 20 and the lateral wall 21. However, the arc-shaped connecting strip, the lateral wall 21 and the base plate 20 jointly define a gap 22*h*. Accordingly, a portion of the insulator 11 fills into the gap 22*h*. In the embodiment shown in FIG. 8D, the inner surface 22*s* of the stress dispersing structure 22D is a convex surface. Moreover, in the embodiment shown in FIG. 8E, the inner surface 22*s* of the stress dispersing structure 22E is a concave surface. However, in another embodiment, the stress dispersing structure 22D (or 22E) can be a line-shaped connecting strip, and the present disclosure is not limited to the examples provided herein.

Figure 8F:
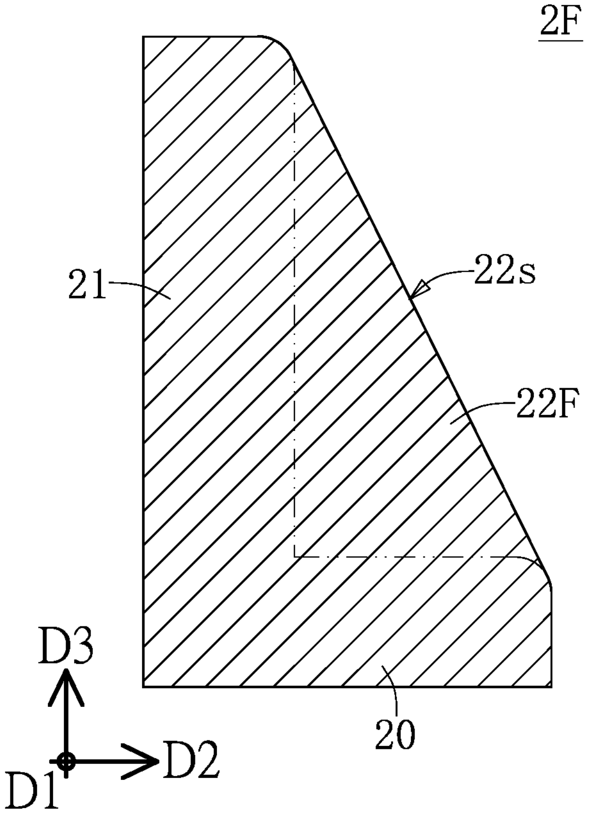

As shown in FIG. 8F, in the external electrode 2F of the instant embodiment, the stress dispersing structure 22F is a protruding rib, a cross-sectional view of which approximates to a triangle shape. Accordingly, in the instant embodiment, the inner surface 22*s* of the stress dispersing structure 22C is an inclined surface extending from a distal portion of the lateral wall 21 to a distal portion of the base plate 20. However, the aforementioned details are disclosed for exemplary purposes only, and are not meant to limit the scope of the present disclosure.

Beneficial Effects of the Embodiments

In conclusion, one of the advantages of the inductive device Z1 provided by the present disclosure is that by virtue of each of the external electrodes 2 including a base plate 20, a lateral wall 21, and a plurality of stress dispersing structures 22 extending toward the coiled conductor C1 and protruding from at least one of the base plate 20 and the lateral wall 21, and the stress dispersing structures 22 being spaced apart from each other and engaged with the laminated body 1 or each of the external electrodes 2 including one or more first stack layers A1 and one or more second stack layers A2 that are stacked in the first direction D1, each of the first stack layers A1 including one or more first patterned layers a1, each of the second stack layers A2 having a curved inner surface and including one or more second patterned layers a2, and an area of each of the first patterned layers a1 being less than that of each of the second patterned layers a2, a reliability of the inductive device Z1 can be improved.

To be more specific, when a lateral force is applied to the inductive device Z1 mounted on a circuit board, the stress dispersing structures 22 of the external electrodes 2 can prevent stress from being accumulated on the external electrodes 2 or at a joint position between any one of the external electrodes 2 and the insulator 11. As such, a possibility of the external electrodes 2 being broken due to the applied lateral force can be reduced, thereby improving a reliability of the inductive device Z1.

Referring to Table 1 as follows, a maximum stress on the inductive device is simulated under a push test being performed on each one of the embodiments provided in the present disclosure, and experimental samples 1, 2. In an inductor of the experimental sample 1, the external electrode includes only a base plate and a lateral wall, i.e., the external electrode includes only the first patterned layers a1 shown in FIG. 6, and is L-shaped. In an inductor of the experimental sample 2, the external electrode includes only a base plate and a lateral wall, i.e., the external electrode does not include the first patterned layer a1, and includes only the second patterned layers a2 shown in FIG. 6. The inductive device Z1 of any one of the embodiments of the present disclosure includes any one of the external electrodes 2, 2', and 2A to 2F, which are respectively shown in FIG. 5, FIG. 6, and FIGS. 8A to 8F.

TABLE 1

| | Maximum stress |
|---|---|
| Experimental sample 1 | 503 MPa |
| Experimental sample 2 | 392 MPa |
| Embodiments | 190 MPa~250 MPa |

It can be observed from Table 1 that compared to the experimental sample 1, a maximum stress on the inductive device Z1 of any one of the embodiments can be reduced by 50% to 60%. Compared to the experimental sample 2, the maximum stress on the inductive device Z1 of any one of the embodiments can be reduced by 30% to 50%. That is to say, compared to the experimental samples 1 and 2, any one of the stress dispersing structures 22, and 22A to 22F of the external electrodes 2, 2', and 2A to 2F can effectively disperse stress, and prevent the stress from being locally accumulated on a specific region of the inductive device Z1. Accordingly, by using any one of the external electrodes 2, 2', and 2A to 2F, which are respectively shown in FIG. 5, FIG. 6, and FIGS. 8A to 8F, the maximum stress on the inductive device Z1 can be significantly reduced, so as to prevent the inductive device Z1 from being broken. However, the present disclosure is not limited to the abovementioned examples.

As mentioned above, the simulation results show that compared to the experimental samples 1 and 2, by using any one of the external electrodes 2, 2', and 2A to 2F provided in the present disclosure, each one of the stress dispersing structures 22, and 22A to 22F can effectively disperse stress and prevent an accumulation of the stress. As such, a possibility of the inductive device Z1 being damaged due to a lateral force can be reduced, thereby improving the reliability of the inductive device Z1. Furthermore, a simulation result shows that by using any one of the external electrodes 2A to 2E shown in FIGS. 8A to 8E, respectively, a maximum stress which the inductive device Z1 withstands can be further decreased to 210 MPa, or even lower.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An inductive device, comprising: a laminated body including an insulator and a plurality of conductive wiring layers stacked in a first direction, wherein the conductive wiring layers are embedded within the insulator, and any two adjacent ones of the conductive wiring layers are electrically connected to each other to form a coiled conductor that extends spirally; and two external electrodes disposed on the laminated body and electrically connected to the coiled conductor, wherein the two external electrodes are spaced apart from each other;

wherein each of the external electrodes includes one or more first stack layers and one or more second stack layers that are stacked in the first direction, each of the first stack layers includes one or more first patterned layers, and each of the second stack layers includes one or more second patterned layers, and an area of each of the first patterned layers is less than an area of each of the second patterned layers, and each of the first patterned layers and each of the second patterned layers partially overlap with each other:

wherein, a ratio between a number of the second patterned layers of one second stack layer and a number of the first patterned layers of one first stack layer is 3:2, wherein the first stack layers and the second stack layers form a base plate, a lateral plate, and a plurality of stress dispersion structures, wherein the stress dispersion structures are formed by a portion of each of the second patterned layers that does not overlap with any one of the first patterned layers, wherein the stress dispersion structures extend toward the coiled conductor and protrude from at least one of the base plate and the lateral wall, and the stress dispersing structures are spaced apart from each other and engaged with the laminated body.

2. The inductive device according to claim 1, wherein each of the stress dispersing structures is a connecting strip, a protruding rib, a protruding column, or a protruding bump.

3. The inductive device according to claim 1, wherein each of the stress dispersing structures is a connecting strip, two opposite ends of the connecting strip being respectively connected to the base plate and the lateral wall, and wherein the connecting strip, the base plate, and the lateral wall jointly define a gap, a portion of the insulator being filled into the gap.

4. The inductive device according to claim 1, wherein each of the stress dispersing structures has an inner surface facing toward the coiled conductor, and the inner surface is a concave surface, a convex surface, a stepped surface, or an inclined surface.

5. The inductive device according to claim 1, wherein each of the stress dispersing structures has an inner surface facing toward the coiled conductor, and the inner surface protrudes from an inner side surface of the lateral wall to form a step difference.

6. The inductive device according to claim 1, wherein the base plates of the two external electrodes are partially exposed at a same side of the insulator, and the lateral walls of the two external electrodes are partially exposed at two opposite side surfaces of the insulator, respectively.

7. The inductive device according to claim 1, wherein two of the conductive wiring layers that are respectively closest to two opposite side surfaces of the insulator are connected to the external electrodes, respectively.

8. The inductive device according to claim 1, wherein the stress dispersing structures, the lateral wall, and the base plate of each of the external electrodes jointly define at least one recessed space, and a portion of the laminated body fills into the at least one recessed space.

9. The inductive device according to claim 1, wherein a quantity of the first stack layers is M, and a quantity of the second stack layers is N, and wherein N, M are each a positive integer that is equal to or greater than 1, and N≥M.

10. The inductive device according to claim 1, wherein a ratio of a difference between the area of each of the second patterned layers and the area of each of the first patterned layers to the area of each of the first patterned layers ranges from 1.02 to 2.15.

11. The inductive device according to claim 1, wherein the laminated body further includes a plurality of conductive posts, and each of the conductive posts is connected between two adjacent ones of the conductive wiring layers.

12. An inductive device, comprising:

a laminated body including an insulator and a plurality of conductive wiring layers stacked in a first direction, wherein the conductive wiring layers are embedded within the insulator, and any two adjacent ones of the conductive wiring layers are electrically connected to each other to form a coiled conductor that extends spirally; and two external electrodes disposed on the laminated body and electrically connected to the coiled conductor, wherein the two external electrodes are spaced apart from each other;

wherein each of the external electrodes includes one or more first stack layers and one or more second stack layers that are stacked in the first direction, each of the first stack layers includes one or more first patterned layers, each of the second stack layers has a curved inner surface and includes one or more second patterned layers, and an area of each of the first patterned layers is less than that of each of the second patterned layers, and a ratio between a number of the second patterned layers of one second stack layer and a number of the first patterned layers of one first stack layer is 3:2.

13. The inductive device according to claim 12, wherein a quantity of the first stack layers is M, and a quantity of the second stack layers is N, and wherein N, M are each a positive integer that is equal to or greater than 1, and N≥M.

14. The inductive device according to claim 12, wherein a ratio of a difference between the area of each of the second patterned layers and the area of each of the first patterned layers to the area of each of the first patterned layers ranges from 1.02 to 2.15.

15. The inductive device according to claim 12, wherein the laminated body further includes a plurality of conductive posts, and each of the conductive posts is connected between two adjacent ones of the conductive wiring layers.

* * * * *